Dec. 23, 1969 D. W. GILMER 3,484,981
NET
Filed Sept. 15, 1967 2 Sheets-Sheet 1
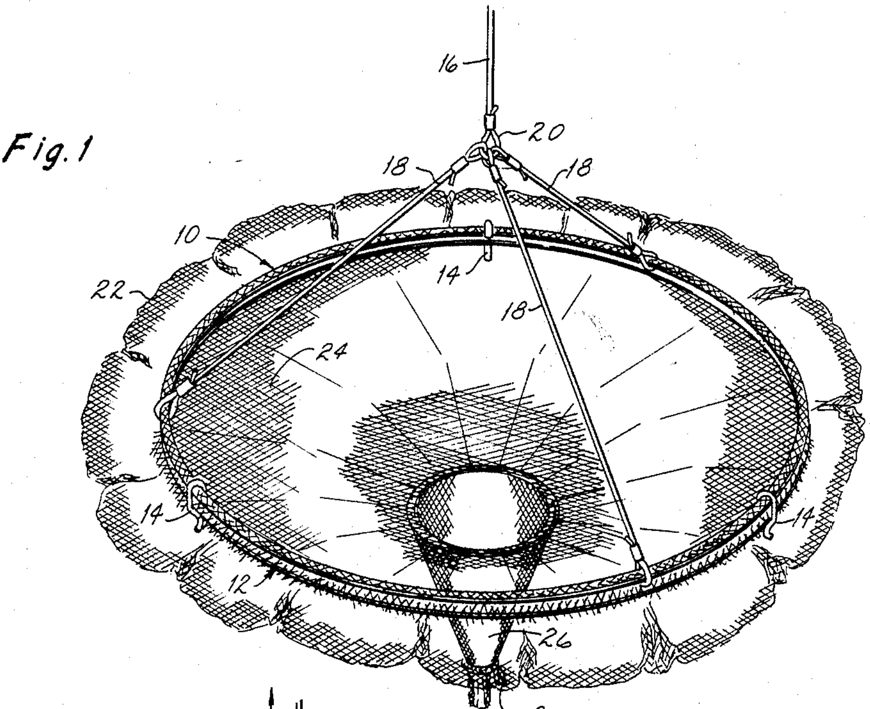
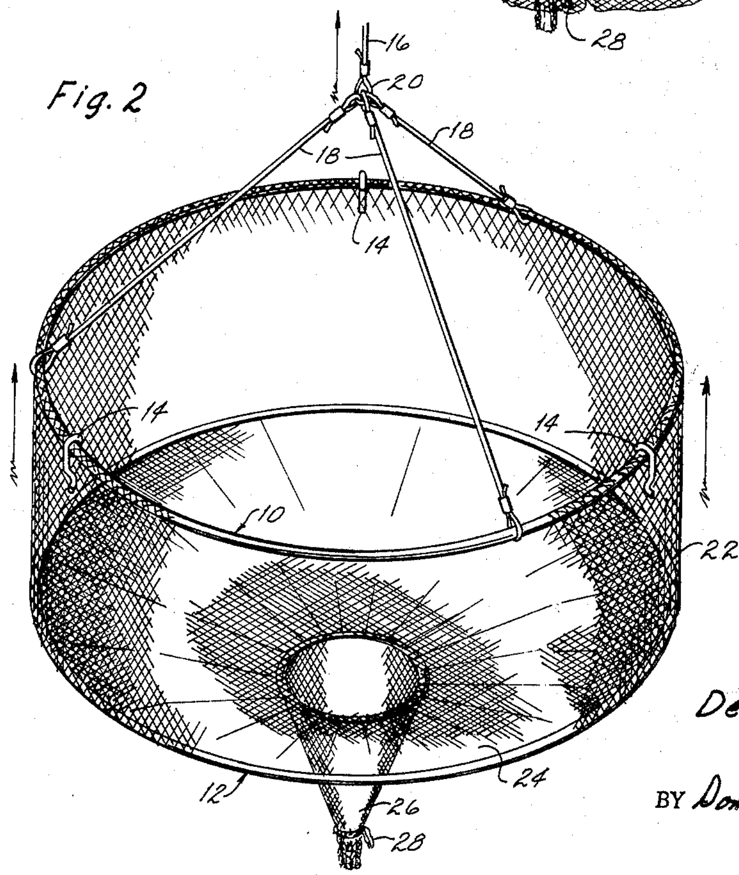
Deward W. Gilmer
INVENTOR.
BY Dominik, Stein & Knechtel
ATTORNEYS

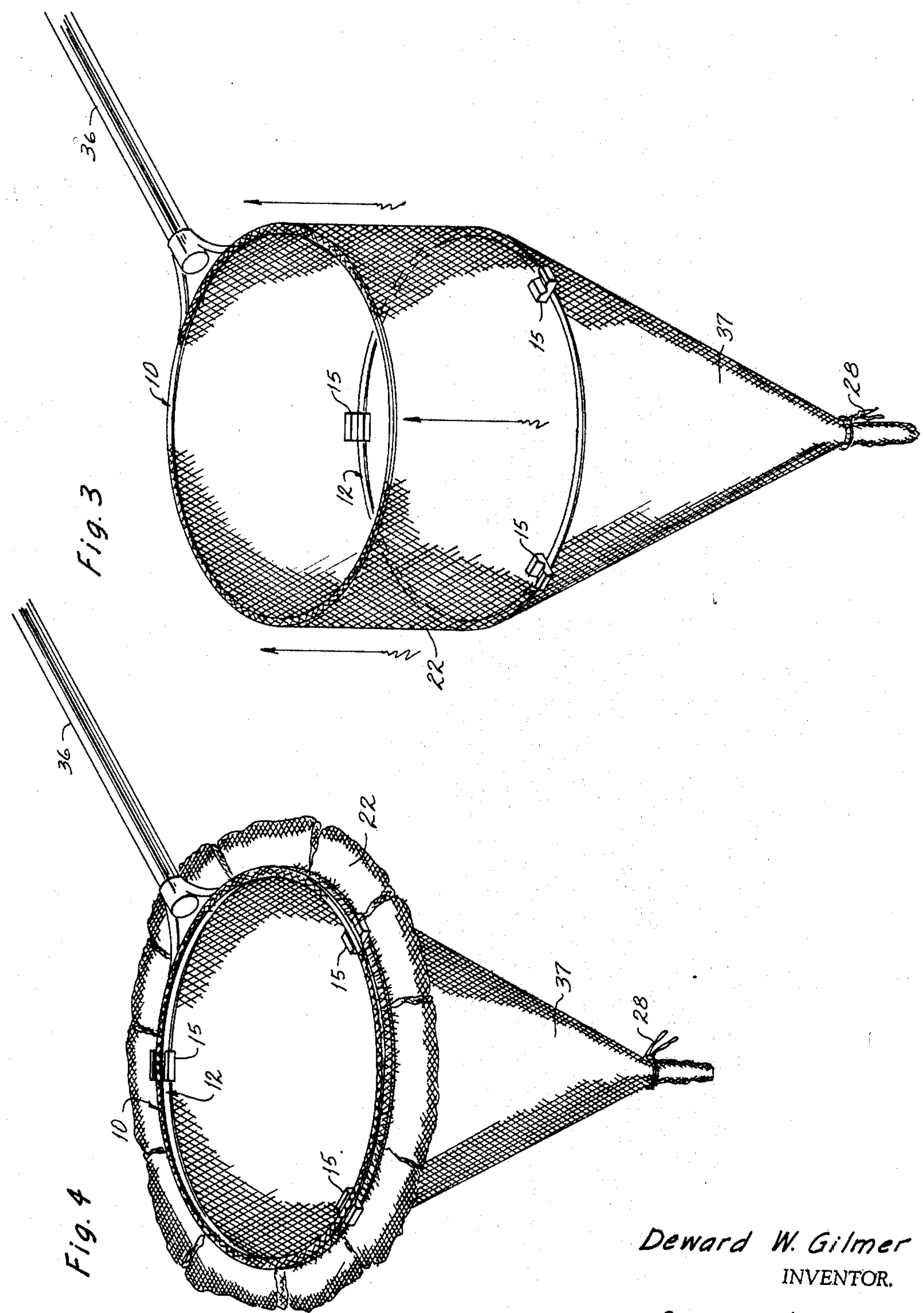
Deward W. Gilmer
INVENTOR.
BY Dominik, Stein & Knechtel
ATTORNEYS

United States Patent Office 3,484,981

Patented Dec. 23, 1969

3,484,981

NET

Deward W. Gilmer, 4747 8th Ave. S., St. Petersburg, Fla. 33711

Filed Sept. 15, 1967, Ser. No. 667,888
Int. Cl. A01k *69/10, 77/00*
U.S. Cl. 43—105 10 Claims

ABSTRACT OF THE DISCLOSURE

A fish net having upper and lower annular ribs with side netting spanned therebetween and bottom netting across the bottom rib catches or magnets releasably hold the ribs together until a fish swims over the net whereby a jerk on the cord or pole affixed to the top rib causes the top rib to telescope upwardly to ensnare the fish.

The invention relates to a net and more particularly to a net which can be used for the purpose of trapping fish, minnows, crabs, or other forms of sea life.

The effectiveness of nets of this type has always been limited by two factors:

(1) the speed with which the user is able to move the net through water; and (2) the degree to which fish or other sea life are able to detect the presence of the net, and hence be frightened away.

Several attempts have been made to overcome these difficulties.

U.S. Patents 1,786,342 and 2,399,193 both show collapsible fish nets; however, both require that the net be placed on the lake or sea bottom. This limits the usage of such nets to bottom fishing and to relatively shallow waters.

U.S. Patent 2,652,656 teaches a collapsible trap which would appear to be a good method for overcoming the usually heavy drag which nets encounter by the use of spring loaded resilient ribs. Unfortunately, this trap is relatively complex.

U.S. Patent 1,339,275 discloses a trap which can be collapsed and fastened in such position; however, this is only for convenience of transport and plays no active part in the utilization of the device.

An object of this invention is to provide a fishing type net or trap which is relatively undetectible to sea life.

Another object is to provide a net of the above character which can be used at any reasonable depth.

Still another object is to provide a net of the above character which is not greatly restricted in its motion by the customary heavy drag usually encountered by nets which move in water.

A further object is to provide a net which is easily used.

A still further object is to provide a net which is relatively simple in structure.

Other objects of the invention will in part be obvious and will in part appear hereinafter.

In accordance with the above objectives, a telescoping type net has now been conceived which can be held in the collapsed position at any depth of a body of water. It consists of upper and lower annular ribs with side netting spanned therebetween and bottom netting across the bottom rib. Suitable catches or magnets hold the ribs together. The net, in collapsed form, is suspended under the surface of the water by a cord or rope fastened to the upper rib, when in the form of a basket, or, when in the form of a dip net, by a dip-pole. Upon jerking the rope or the pole, or suddenly moving the rope or pole upwardly, the catches or magnets are disengaged and the upper rib with side netting attached thereto telescopes upwardly ensnaring fish or other sea life therein.

For a fuller understanding of the nature and objects of the invention, reference should be had to the following detailed description taken in connection with the accompanying drawings, in which:

FIG. 1 shows the invention, embodied as a basket-type net, in the collapsed position.

FIG. 2 is a prospective view of the basket net of FIG. 1, in the telescoped or open position.

FIG. 3 is a prospective view of the invention, in the form of a dip net, in the telescoped position.

FIG. 4 is a prospective view of the net of FIG. 3 in the collapsed position.

Similar reference characters refer to similar parts throughout the several views of the drawings.

As best seen in FIG. 2, the invention, in its rudimentary form, comprises a substantially annular upper support rib 10, and a substantially annular lower drop rib 12, preferably of the same diameter as rib 10. Spaced about said ribs are spring catches 14 (in FIGS. 1 and 2), which are affixed to rib 10 and snap over rib 12, or magnets 15 (in FIGS. 3 and 4), which are preferably affixed to rib 12 and are of V-shape as shown to more easily accommodate the upper rib 10 and to avoid side slip during use. Their dyne force is designed to enable easy release. Magnetized ribs could also be used. These fastening means hold rib 12 adjacent rib 10 in the collapsed form.

In the embodiment shown in FIGS. 1 and 2, rib 10 is suspended from rope 16 by several connector cords 18 through coupling 20. A length of side netting 22 is secured to rib 10 and also to rib 12 by lacing or other suitable method. Netting 24 is also fastened across rib 12 to form a bottom. The net thereby takes on the shape of a basket when in open form.

In the embodiment shown in FIGS. 3 and 4, the upper support rib 10 is secured to a dip pole 36.

A small sock or funnel of additional netting 37 may optionally be attached to the central portion of bottom netting 24 to facilitate removal of fish. The funnel 37 is opened and closed by drawstring 28 or other suitable closing device.

In FIGS. 1 and 4, the net is shown in its closed condition, that is, ribs 10 and 12 are held together by spring catches 14 or magnets 15. In FIGS. 2 and 3, the net is shown in open or extended condition.

To use either embodiment of net, the fisherman first fastens ribs 10 and 12 together with spring catches 14 or magnets 15. He then lowers the net into the water. Because the net is collapsed, it is in a nearly planer configuration, and is less visible to sea life than if in cylindrical form. Then, when a fish or other sea life approaches the net, usually in a horizontal manner, the net will mostly appear edge-on and hence be difficult to detect.

As the fish or other sea life swims above the net, the fisherman gives a jerk or strong upward pull on rope 16 or upward motion to rod 36, which lifts rib 10 upwardly. Because of inertia on rib 12, and bottom net 24, rib 12 is delayed in its response to the upward motion, thereby disengaging catches 14 or magnets 15. Rib 10 is now free to rise rapidly through the water without the drag of netting 24, thereby allowing great speed in the telescoping movement of the net. This great speed allows rib 10 to reach the surface of the water before the fish or other sea life has time to swim away, thereby entrapping it inside.

The net is then removed from the water and funnel 26, 37 may be placed directly above a bucket or pail and drawstring 28 loosened to empty the net.

If desired, fish or other sea life may be attracted to the net by bait, chum, or a shining light, if used at night, placed in funnel 26, 37 or on bottom net 24.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Now that the invention has been described, what is claimed is:

1. A telescoping type fish net which comprises upper and lower substantially annular ribs, fastening means to fasten said ribs together, said fastening means being of such construction as to allow release of said ribs when one rib is subjected to a sudden separating force, separating means for separating the ribs, and side netting spanned between said two ribs and bottom netting across the lower of said two ribs.

2. The net of claim 1 wherein said means comprise spring catches.

3. The net of claim 2 wherein said bottom netting includes a funnel net incorporated therein with draw-string opening means.

4. The net of claim 3 wherein said separating means comprises rope-like connectors attached to the upper annular rib.

5. The net of claim 3 wherein said separating means comprises a dip-pole handle attached to the upper annular rib.

6. The net of claim 1 wherein said fastening means is further defined as magnetic fastening means to releasably fasten said ribs together.

7. The net of claim 6 wherein said magnetic means comprises magnets attached to one of said ribs and said magnets having a V-shaped portion to accommodate and magnetically retain the other of said ribs, and at least the other of said ribs being fabricated of a magnetizable material.

8. The net of claim 7 wherein said bottom netting includes a funnel net incorporated therein with draw-string opening means.

9. The net of claim 8 wherein said separating means comprises rope-like connectors attached to the upper annular rib.

10. The net of claim 8 wherein said separating means comprises a dip-pole handle attached to the upper annular rib.

References Cited

UNITED STATES PATENTS

| | | | |
|---|---|---|---|
| 2,544,026 | 3/1951 | Kern et al. | 43—61 |
| 3,029,546 | 4/1962 | Ruiz | 43—105 |
| 3,314,187 | 4/1967 | Marcinkowski | 43—105 |

FOREIGN PATENTS

| | | |
|---|---|---|
| 491,508 | 2/1919 | France. |
| 25,510 | 1912 | Great Britain. |
| 228,461 | 2/1925 | Great Britain. |

WARNER H. CAMP, Primary Examiner

U.S. Cl. X.R.

43—12